United States Patent [19]
Weik

[11] Patent Number: 4,698,227
[45] Date of Patent: Oct. 6, 1987

[54] PLATE PUNCHING DEVICE WITH SEPARATE CHAMFERING TOOL MOUNTED TO INTERNAL PRESSURE PLATE

[75] Inventor: George Weik, Neu-Ulm, Fed. Rep. of Germany

[73] Assignee: Lingl Corporation, Paris, Tenn.

[21] Appl. No.: 917,156

[22] Filed: Oct. 9, 1986

[30] Foreign Application Priority Data

Oct. 11, 1985 [DE] Fed. Rep. of Germany ....... 3536396

[51] Int. Cl.⁴ ............................................. B29C 59/02
[52] U.S. Cl. .................................... 425/296; 425/299; 425/304; 425/305.1; 425/297; 83/581.1
[58] Field of Search ................ 425/289, 290, 297–299, 425/302.1, 304, 306, 305.1, 308, 310, 311, 313; 83/581.1

[56] References Cited

FOREIGN PATENT DOCUMENTS 2525925 9/1976 Fed. Rep. of Germany .
0564126 9/1944 United Kingdom ................ 425/298
0866707 4/1961 United Kingdom ................ 425/290

*Primary Examiner*—Charles Hart
*Attorney, Agent, or Firm*—Nixon & Vanderhye

[57] ABSTRACT

In the production of ceramic plates, the wet uncured extruded clay substrate is cut into plate shaped pieces by vertically reciprocating punching knives disposed about at least a portion of a plate shaped area. A pressure plate is mounted within the punching knives and vertically movable against spring forces therewithin so as to maintain downward pressure against the substrate material during the plate cutting operation. Chamfered plate edges are formed by special chamfering knives adjustably mounted at the edge of the pressure plate. The chamfering knives depend from the pressure plate and extend outwardly into contact with and inside wall surface of the punching knives so as to avoid undesirable burrs at the plate edge and also to permit convenient adjustment of the chamfering knives to compensate for wear.

10 Claims, 1 Drawing Figure

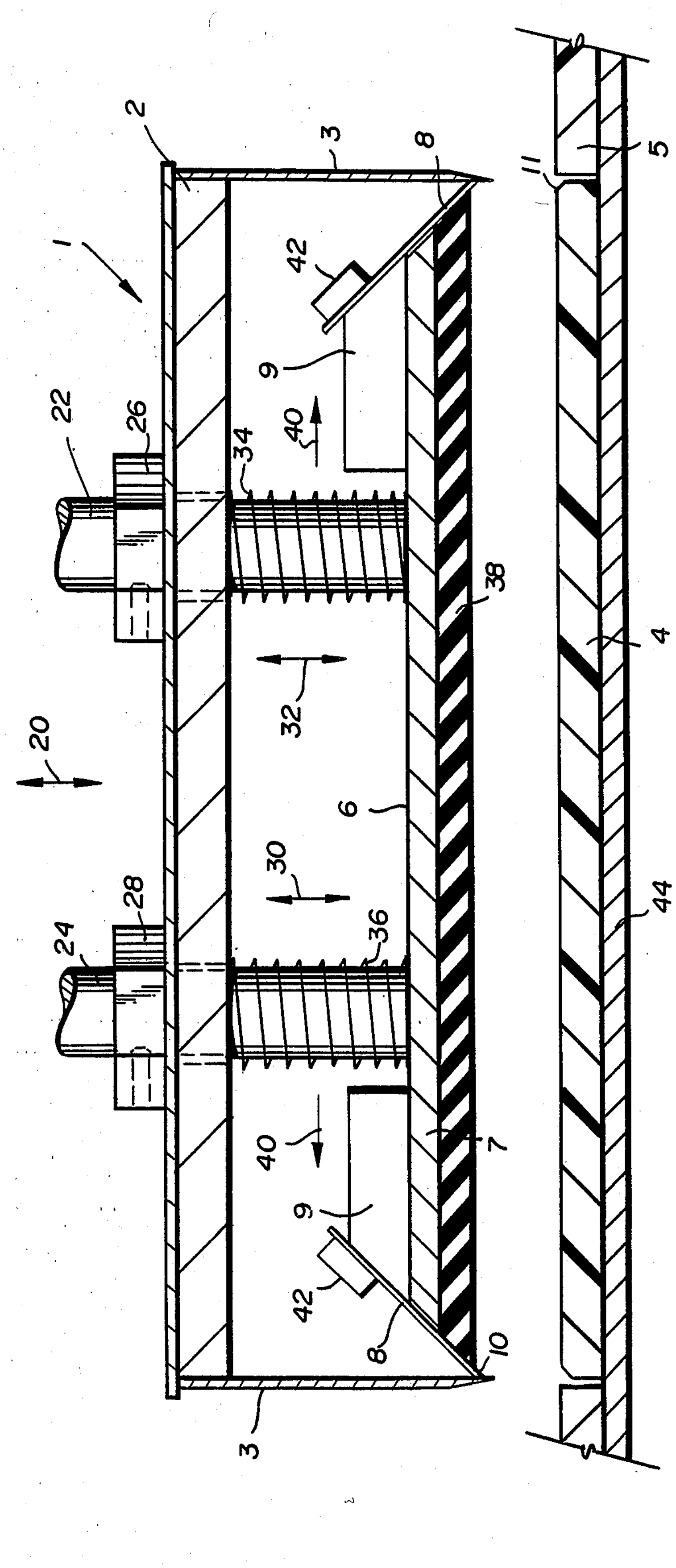
1
2
3
8
42
9
22
26
34
40
38
32
20
6
30
28
24
36
7
10
5
11
4
44

PLATE PUNCHING DEVICE WITH SEPARATE CHAMFERING TOOL MOUNTED TO INTERNAL PRESSURE PLATE

This invention generally relates to punching devices used to punch-cut plates with chamfered edges from a substrate of uncured clay material.

In the production of ceramic plates, it is common practice to extrude wet uncured clay material in a substantially continuous substrate and then to cut the substrate into appropriate plate-shaped portions for subsequent treatment (including kiln curing) so as to produce a desired ceramic plate. It is also common practice to perform the plate cutting function with a vertically reciprocating punch device which has cutting or punching knives disposed about at least a portion of a shaped plate area. Typically, such prior punching devices also include an internal press plate which is vertically moveable within the punching device against spring forces so as to maintain uniform downward pressure across the surface of the substrate during the plate-cutting operation.

One such prior known punching device is described in DE-AS No. 25 25 925. In this particular prior punching device, the press plate includes a profiled surface which includes shaped edges for also automatically chamfering the plate edges during the punch operation. That is, the edges of such prior press plates include suitable depending projections so as to form a chamfered edge about the cut plate at the same time as the punch is reciprocated downwardly to cut the plate from the clay substrate.

Unfortunately, such prior art arrangements suffer from several disadvantages. In particular, since there is typically a minimal separation between the edges of the pressure plate and the punching knives, this can create an undesirable burr on the chamfered and punched plate edge when some of the wet clay enters into this separation area. And, as the relatively moving parts become worn, the separation increases even further. Additionally, as the device is utilized in production environments, some of the uncured clay material will unavoidably be squeezed into such separation spaces and (especially if such undesirable clay particles are permitted to cure or dry in place), this interstitial clay material tends to further wedge an even wider separation between the chamfer-forming edges of the pressure plate and the punching knives.

As also can be appreciated, a specially formed pressure plate having chamfer-forming edges is relatively expensive.

I now have discovered a punching device of this same general type (i.e., capable of automatically producing chamfered edges on the cut plates) but which has greatly improved characteristics by maintaining a flexible adaptation of the punching and chamfering tools with respect to one another. In brief, the chamfer-forming device constitutes a separate tool adjustably mounted about the edges of the pressure plate. Not only is a separate chamfering tool of this type relatively inexpensive to realize, it can be adjustably positioned so as to depend from the edges of the pressure plate and extend into contact with the inside surfaces of the punch-cutting knives. In this manner, it is possible substantially to avoid any separation between these elements and thus to prevent the formation of undesirable burrs on the chamfered edges of a cut plate—while simultaneously also substantially preventing undesirable penetration of wet uncured clay material into any interstitial space between the chamfering tool and the punching knives. The result is substantially continuous smooth operation of the punching device with only occasionally required adjustments of the separate chamfering knives with respect to the pressure plate (e.g., when the edges of the chamfering tool become worn).

These as well as other objects and advantages of the invention will be more completely understood and appreciated by careful study of the following detailed description of a presently preferred exemplary embodiment of the invention, taken in conjunction with the accompanying drawing in which:

The drawing depicts a cross-sectional view of an exemplary punching device including separate chamfering knives which are adjustably mounted about the edges of a pressure plate and also depicting a cut plate of uncured clay material with chamfered edges.

As shown in the drawing, the punching device 1 includes a knife frame 2 and punching knives 3 mounted as an assembly which is reciprocated by conventional means 20 with respect to an extruded strand or substrate 5 of wet uncured clay material. As depicted in the drawing, the downward movement of knives 3 against support 44 (e.g., a supported conveyor belt) will punch-cut a plate 4 from the strand 5. Preferably, plate 4 has chamfered edges 11.

Within the punching device 1, there is a subassembly 6 carried by rods 22, 24 and vertically moveable with respect to plates 3 and frame 2 (e.g., via conventional mounting arrangements in frame 2) as shown by arrows 30, 32. Springs 34, 36 bias the subassembly 6 in a downward position defined by stop members 26, 28 associated with rods 22, 24 respectively.

The subassembly 6 (vertically moveable within knives 3) includes a conventional pressure plate 7 with a conventional cushion surface 38. Thus, as the punch device 1 is lowered onto strand 5, the knives 3 initially come into contact with the edges of plate 4 and, as the punching device 1 is further lowered, pressure plate 7 with cushion surface 38 comes into contact with the top surface of the plate 4 and holds it firmly in place via the bias forces of springs 34, 36 while the subassembly 6 moves vertically upwardly within knives 3 as the device 1 continues down to finish punch-cutting plate 4 from strand 5.

As shown in the drawing, separate chamfering tools 8 which are movably supported about the edges of press plate 7. Thus, the chamfering tools 8 can be adjusted relative to punching knives 3 so as to maintain the downwardly and outwardly depending edges of leaf-shaped chamfering knives 10 into butt-flush contact against the inside edges of punching knives 3 at the desired angle of chamfer 11.

In addition to the leaf-shaped chamfering knives 10, the chamfering tools 8 include a horizontally adjustable thrust support 9 so as to maintain the desired butt-flush contact between the lower depending edge of knives 10 and the inside edges of knives 3. By virtue of adjustable mounting 42 of blade 10 to the horizontal thrust support 9 and/or by virtue of adjustable mounting of the horizontal thrust support 9 onto the pressure plate 7, the position of the downwardly depending edge of the leaf-shaped chamfering knives 10 can be adjusted from time-to-time to compensate for wear. The mounts 42 and/or 9 may also include outwardly-directed spring loading (e.g., depicted by arrow 40) for positively maintaining the chamfering knives 10 in contact with knives 3 at all times.

During normal operation, the punching device 1 is lowered until the chamfering and holding-down subassembly 6 comes to rest on the substrate 5. As this downward motion is continued, the chamfering knives 10 chamfer the cut edge while the punching knives 3 continue to be pushed through the strand (e.g., against a conventional support structure 44) until the plate 4 is completely punched-cut. At this point, the punch device 1 is reciprocated upwardly and out of the way so that the strand 5 may be indexed to place a new section in position for punch-cutting.

As will be appreciated, cutting and chamfering along the longitudinal direction of strand 5 may take place (e.g., before punch-cutting in the transverse or cross-machine direction) with conventional disc-like rollers (not shown). Alternatively, the punch device 1 could include punching and chamfering elements in the longitudinal or machine direction.

While only one exemplary embodiment of the invention has been described in detail, those skilled in the art will recognize that many variations and modifications may be made in this exemplary embodiment while yet retaining many of the novel features and advantages of this invention. Accordingly, the appended claims are intended to cover all such variations and modifications.

What is claimed is:

1. A punching device for use in the production of ceramic plates, including a punching tool with punching knives and a press plate arranged to be vertically movable within the punching knives which press plate, upon punching of an uncured ceramic plate material, can be pressed into a strand of the uncured plate material, said punching device comprising a chamfering tool mounted on the sides of the press plate (7) facing the punching knives (3), said chamfering tool comprising leaf-shaped chamfering knives (10), which chamfering knives butt flush against the punching knives (3) at a predetermined chamfer angle and which knives are adjustably mounted on the press plate (7).

2. A punching device as in claim 1, wherein said chamfering knives (10) are mounted on thrust supports (9) which are, in turn, mounted so as to be horizontally adjustable with respect to the press plate (7).

3. A punching device for punch-cutting plates with chamfered edges from a substrate of uncured clay material, said punching device comprising:

punching knife means arranged about at least a portion of a shaped plate area and disposed for common vertical movement with respect to said substrate such that the substrate is cut upon downward movement of the punching knife means;

a press plate disposed adjacent the punching knife means and also disposed for vertical movements with respect to the punching knife means so as to press downwardly against the top surface of the substrate during plate cutting operations; and separate chamfering means attached to the press-plate, depending about an edge of the press plate and extending into contact with said punching knife means.

4. A punching device as in claim 3 wherein said chamfering means is adjustably mounted on said press plate.

5. A punching device as in claim 4 wherein said chamfering means is mounted with respect to said press plate at an angle which is the chamfering angle imposed on the edges of the cut plate portion of the substrate.

6. A punching device as in claim 5 wherein said chamfering means is mounted on said press plate with thrust supports.

7. A punching device as in claim 6 wherein said thrust supports are horizontally adjustable with respect to the press plate.

8. In a punch-cutting device having a punch-cutting knife and vertically moveable pressure plate disposed adjacent said punch-cutting knife, the improvement comprising:

a chamfering knife disposed about an edge of said pressure plate and having an outwardly downwardly depending knife edge for forming a chamfer about an edge of articles punch cut by said punch-cutting knife; and means for maintaining said outwardly and downwardly depending knife edge in contact with said punch-cutting knife.

9. An improved punch-cutting device as in claim 8 wherein said chamfering knife is mounted at an angle with respect to said pressure plate corresponding to the chamfering angle imposed on the edge of a punch-cut article.

10. An improved punch-cutting device as in claim 9 including horizontal thrust supports mounting said chamfering knife to said pressure plate.

* * * * *